United States Patent
Takiguchi et al.

(10) Patent No.: US 6,347,482 B1
(45) Date of Patent: Feb. 19, 2002

(54) SAFETY DEVICE FOR POWER WINDOWS

(75) Inventors: Tsutomu Takiguchi; Fusao Fukazawa; Keiichi Tajima, all of Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/533,661

(22) Filed: Mar. 23, 2000

(30) Foreign Application Priority Data

Mar. 23, 1999 (JP) .......................................... 11-077154

(51) Int. Cl.$^7$ ................................................. E05F 15/02
(52) U.S. Cl. ........................................... 49/28; 318/466
(58) Field of Search .............................. 49/26, 27, 28; 318/283, 284, 466, 467, 468, 469

(56) References Cited

U.S. PATENT DOCUMENTS

| | | | |
|---|---|---|---|
| 5,351,439 A | 10/1994 | Takeda et al. ................. | 49/28 |
| 5,404,673 A | 4/1995 | Takeda et al. ................. | 49/28 |
| 5,422,551 A | 6/1995 | Takeda et al. ................. | 318/265 |
| 5,459,379 A | 10/1995 | Takeda et al. ................. | 318/469 |
| 5,610,484 A * | 3/1997 | Georgin ......................... | 318/286 |
| 5,801,501 A * | 9/1998 | Redelberger ................... | 318/283 |
| 5,832,664 A | 11/1998 | Tajima et al. .................. | 49/26 |
| 5,963,001 A * | 10/1999 | Peter et al. .................... | 318/563 |
| 5,986,421 A * | 11/1999 | Fukazawa et al. ............. | 318/466 |
| 6,114,820 A * | 9/2000 | Nishigaya ...................... | 318/466 |

FOREIGN PATENT DOCUMENTS

| | | | |
|---|---|---|---|
| DE | 199 10 854 | 4/2001 | |
| JP | 8-303113 | 11/1996 | ........... E05F/15/16 |
| JP | 11-62382 | 3/1999 | ........... E05F/15/10 |

* cited by examiner

Primary Examiner—Curtis A. Cohen
(74) Attorney, Agent, or Firm—Sughrue, Mion, Zinn, Macpeak & Seas, PLLC

(57) ABSTRACT

A safety device for accurately preventing the catching of a hand or neck of a passenger of a vehicle between a windowpane and a window sash uses a potentiosensor 20 for detecting the rotational angular position of an output shaft adapted to rotate at a slower speed by reducing the speed of a rotating shaft of a driving motor 9 for opening and closing a windowpane of a vehicle with a speed reducing mechanism 10. This potentiosensor 20 comprises a resistance track plate 21 on which circular resistance track 25a and conductor tracks 25b, 25c are formed, and a rotating plate 23 having conductive brushes 24a, 24b adapted to slide over the resistance track plate 21. The windowpane position is detected based on a resistance value outputted when the conductive brushes 24a, 24b are rotationally moved on the resistance track 25a in response to the rotating position of the rotating plate 23. The resistance track 25a is supplied with a higher voltage and a lower voltage at diametrically opposite positions, respectively, and the conductive brushes 24a, 24b are constructed so as to output voltages which are divided at a rotating angle of 180 degrees. This enables not only the detection of the windowpane with high accuracy but also the miniaturization of a power window apparatus and simplification of the construction of a circuit thereof.

3 Claims, 10 Drawing Sheets

SAFETY DEVICE FOR POWER WINDOWS

BACKGROUND OF THE INVENTION

1. Field of the Invention

The present invention relates to power windows designed to be used in vehicles such as automobiles for opening and closing windowpanes by means of driving sources such as motors or the like, and more particularly to a safety device for safely controlling the operation of the windowpanes by detecting a state in which, for example, the hand or head is caught between the windowpane and the window sash.

2. Description of the Related Art

In general, since a power window uses a motor or the like for opening and closing a windowpane of an automotive vehicle, there exists a risk of the hand or head of a passenger of the vehicle being caught between the windowpane and an associated window sash. Conventionally, there has been proposed a safety device for preventing an accident by detecting a state in which a foreign object is caught between a windowpane and a window sash of an automotive vehicle and stopping the closing or opening operation of the windowpane when such a state is detected. In a power window safety device like this, for example, a pulse signal oscillator comprising hole elements is mounted on a motor for driving the windowpane, and the absolute and relative speeds of the windowpane when it is closed and the direction in which the windowpane is operated are detected by a detecting means based on a pulse signal from the pulse signal oscillator. In addition, a safety control area is determined where a safety operation is to be carried out to deal with catching of a foreign object and thereafter, catching of a foreign object is detected based on a change in detected output of at least one of the absolute and relative speeds while the windowpane is being closed. Then, when a foreign object is detected as being caught, a safety control is effected in which the windowpane is forcibly operated in the opening direction, so that the foreign object is released from the state in which it is caught between the windowpane and the window sash.

In the safety control area determination technology described above, since there may occur a risk of erroneous determination of the safety control area due to an error in counting the pulse signal, a windowpane position detecting mechanism such as a limit switch is provided in the vicinity of an upper end of the windowpane for detecting a fully closed position of the windowpane with high accuracy, whereafter a safety control area is set. However, providing such a windowpane position detecting mechanism requires mounting position adjusting work in the assembly process in the assembly plant and involves complexity in assembly of vehicles. To omit such complex assembling work, the provision of an automatic position adjusting mechanism was conceived as described in JP-A-8-3-3113, but it led to the complex construction of the power window and has been a cause of higher production costs.

To cope with this, the position of the windowpane which is being operated to open or close is obtained by a position sensor and the opening or closing state of the windowpane is detected by an output from the position sensor. In this case, with a potentiosensor being disposed along a rail on which a windowpane is operated to open and close, since the resistance value of the potentiosensor changes in response to the position of the opening or closing windowpane, the opening or closing state of the windowpane is detected. However, in order to make this possible, a potentiosensor is required which is long enough to cover the whole opening and closing strokes of the windowpane, and providing such a long potentiosensor makes the vehicle window construction complex and the problem of higher production cost cannot be solved.

With a view to solving those problems, the applicant of this application for patent proposes in Japanese Patent Application No. 9-219395 a safety device for a power window comprising a position sensor for detecting the rotational angular position of a driving motor for operating a windowpane of a vehicle to open and close, means for detecting the position of the windowpane being operated to open or close based on an output from the position sensor and means for safely controlling the catching of a foreign object in the window. According to this safety device, not only can the whole opening and closing strokes of the windowpane be detected by the position sensor so as to detect catching of a foreign object in the window for safely controlling the occurrence thereof but also the simplification of the circuit which has been required for the safety device can be realized through the miniaturization of the position sensor. However, in this proposed safety device, of one rotation of the driving motor, an area up to a rotational angle of 330 degrees is used for detection of voltage changes from 0 to 5V corresponding to changes in rotational angle within the area. In recent years, however, more accurate safety control has been demanded and this demands in turn more accurate detection.

SUMMARY OF THE INVENTION

Thus, an object of the present invention is to improve further the safety device previously proposed to thereby provide a safety device for a power window which can perform safety control with higher accuracy by improving the detection accuracy and detection resolution of the detection by the position sensor of the position of a windowpane which is being operated to open or close.

The present invention provides a safety device for power windows in which a windowpane of a vehicle is operated to be opened and closed by a driving motor, and in which the position of the windowpane being operated to open or close is detected so as to safely control catching of a foreign object in a window, comprising a position sensor for detecting a rotational angular position of the driving motor, a position detecting means for detecting the position of the windowpane being operated to open or close based on an output from the position sensor, and a safety control means for safely controlling catching of a foreign object in a window based on the position detecting means, wherein the position sensor is constructed as a potentiosensor which has a resistance track comprising a circular electric resistor pattern and conductive brushes operable so as to slidingly rotate on the resistance track as the driving motor is driven, the resistance track being provided with electrodes at two diametrically opposed points on the circumference of the resistance track, and which is adapted to output from the conductive brushes resistance values resulting from division of a resistance value between the electrodes. For example, the potentiosensor is constructed such that a higher electric potential is supplied to one of the electrodes of the resistance track, while a lower electric potential is supplied to the other electrode and that the conductive brushes output potentials resulting from division of the higher electric potential and the lower electric potential, respectively. In addition, the conductive brushes comprise two conductive brushes which are deviated 90 degrees in a rotational direction thereof, and signals having different phases are outputted from the respective conductive brushes in correspondence with the rotational driving of the driving motor.

In the present invention, as a sensor for detecting the position of the windowpane which is being operated to open or close, the position sensor is provided for detecting the rotational angular position of the driving motor for opening and closing the windowpane, whereby the whole stroke of the windowpane from the fully closed position to the fully opened position is detected only through signals from the driving motor. This allows the miniaturization of the construction of the safety device and simplification of the circuit thereof, and equipment is thereby realized which is suitable for application to automotive vehicles. In addition, used as the sensor is a position sensor that has a circular resistance track and which is constructed so as to output resistance values resulting from the division of the resistance value between the terminals provided at the two diametrically opposed points of the circular resistance track, whereby the ratio of change in output from the position sensor relative to change in position of the windowpane is made larger to thereby enable highly accurate detection of the position of the windowpane, and there exists no state in which the output from the position sensor is made impossible depending on the rotational position of the driving motor to thereby stabilize the output property of the position sensor, enabling highly reliable detection of the windowpane position by the position sensor. Thus, according to the present invention, it is possible to construct a power window apparatus which can realize a more appropriate safety control.

BRIEF DESCRIPTION OF THE DRAWINGS

FIG. 4 shows drawings for explaining a potentiosensor, in which

DETAILED DESCRIPTION OF THE INVENTION

Figure 1:
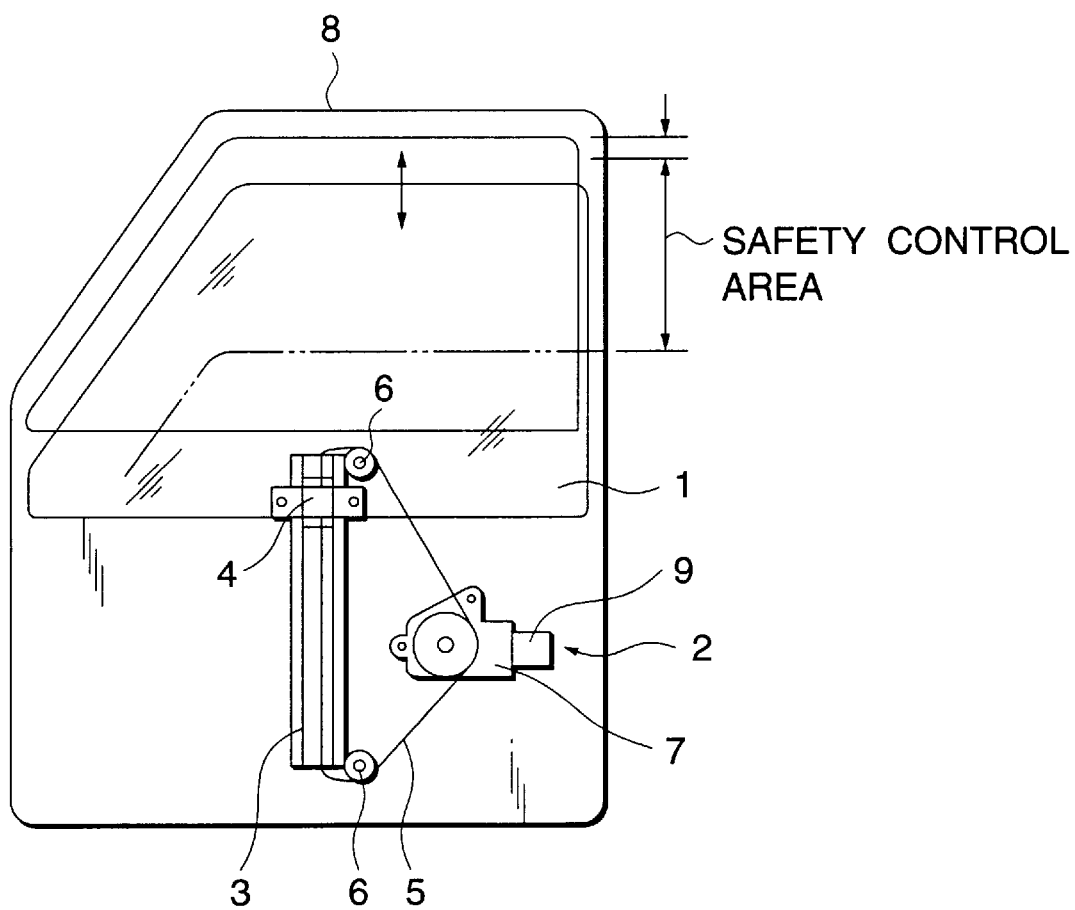
FIG. 1 is a schematic view showing the construction of a window opening and closing mechanism for a power window to which the present invention is applied.

Referring to the drawings, a mode for carrying out the present invention will be described below. FIG. 1 is a typified drawing showing the construction of a power window apparatus to which the present invention is applied. A windowpane 1 is operated to open and close by an opening/closing mechanism 2. Namely, a rail 3 is provided so as to extend vertically along a vehicle body, and a slider 4 is held thereon in such a manner as to slide thereover in vertical directions. A wire 5 is connected to this slider 4, wound round pulleys 6 disposed at upper and lower ends of the rail 3 and connected to a power window driving portion 7, whereby when the power window driving portion 7 is driven, the slider 4 is moved vertically via the wire 5. The windowpane 1 is attached to the slider 4, and a window space defined by a sash 8 is opened and closed when the windowpane 1 is moved vertically together with the slider 4. The aforesaid power window driving portion 7 has a motor 9 as a driving source, and the wire 5 is rotated clockwise and counterclockwise by the rotational force of the motor. For instance, when the motor is rotated clockwise, the windowpane 1 is moved upward to close the window, and when the motor is rotated counterclockwise, the windowpane 1 is moved downward to open the window.

Figure 2:
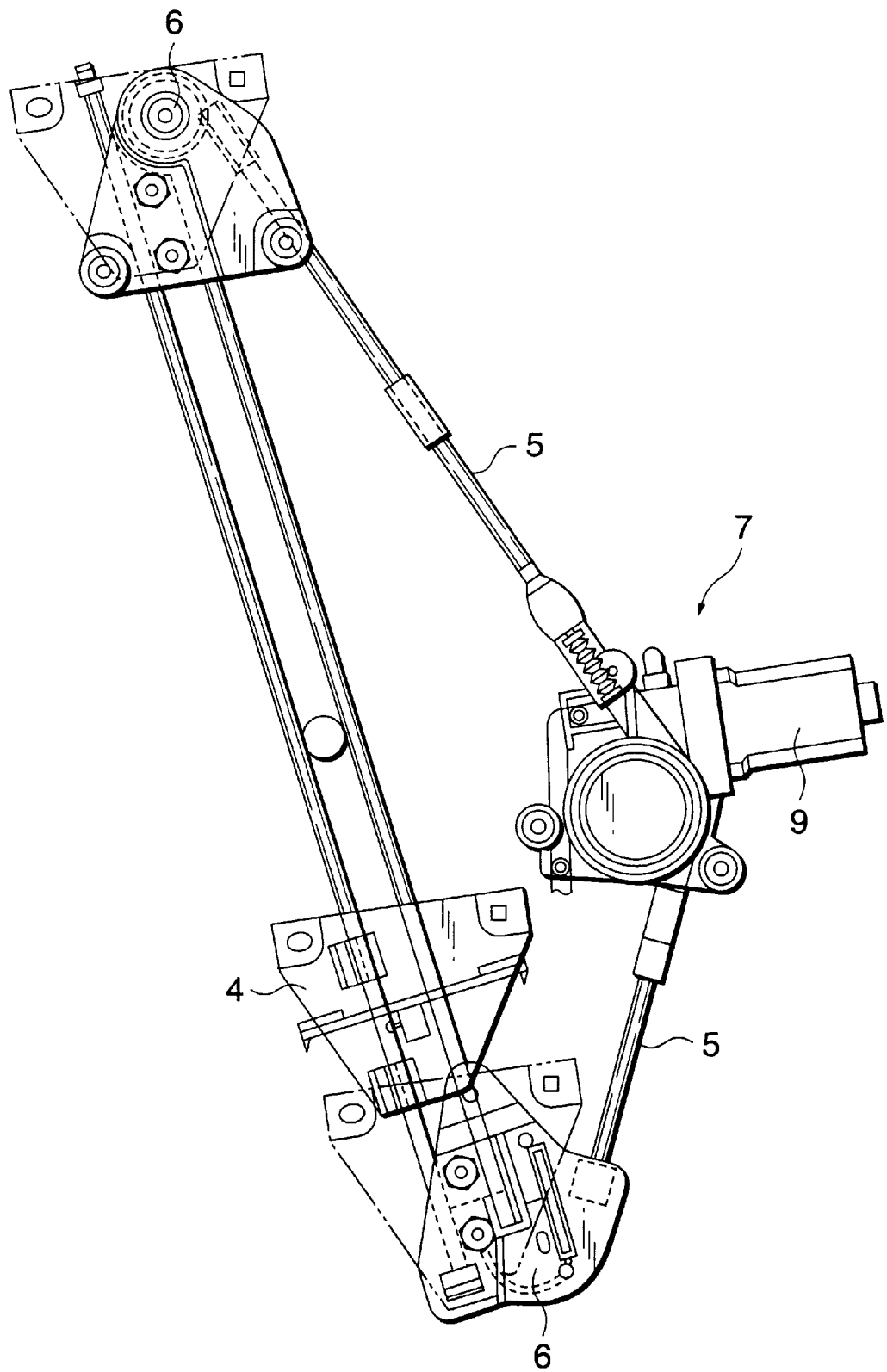
FIG. 2 is a front view of a main part of the window opening and closing mechanism.
Figure 3:
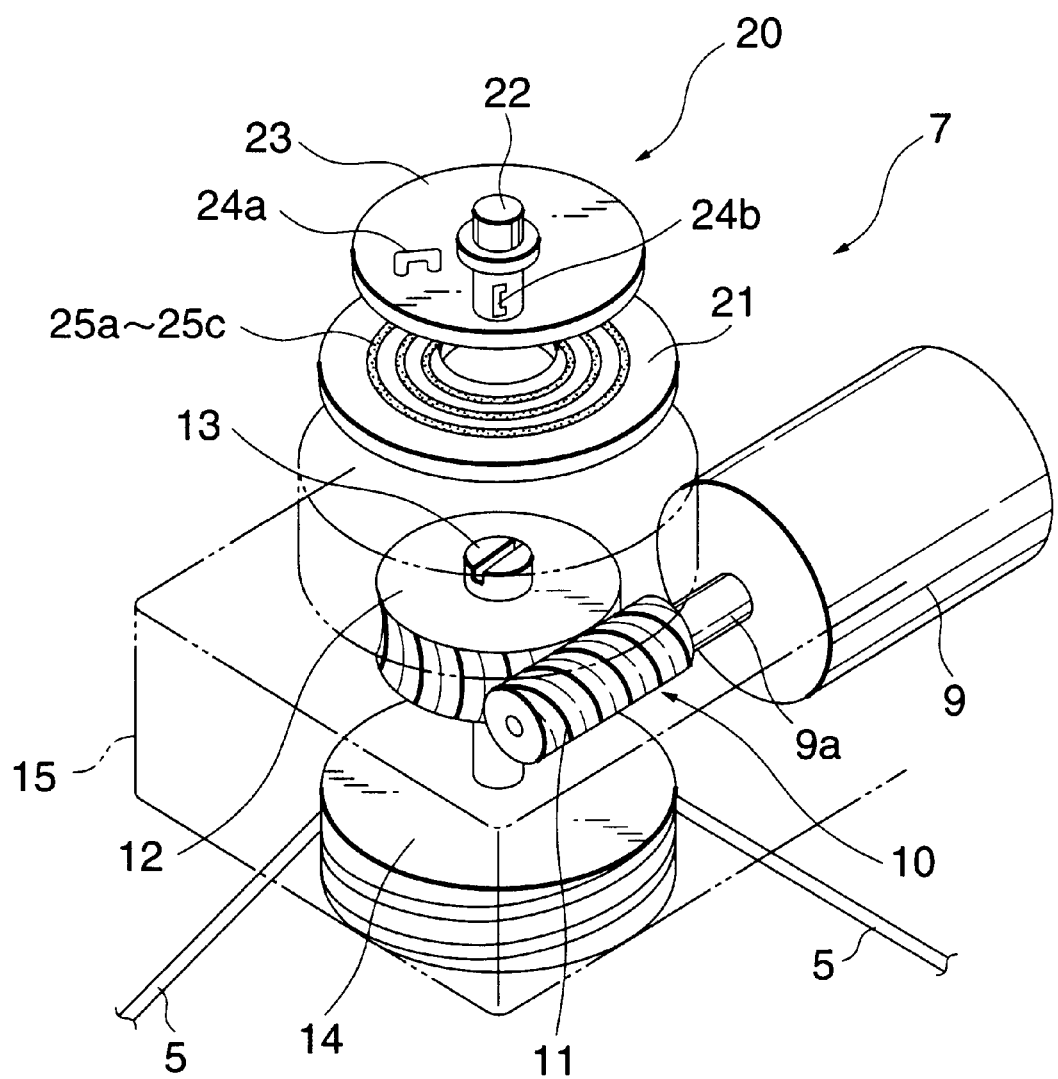
FIG. 3 is a perspective view showing a state in which a main part of a power window driving portion is exploded.

FIG. 2 is a front view of the power window device according to the aforesaid example, and like reference numerals are given to respective portions corresponding to those described in FIG. 1. FIG. 3 shows an exploded view showing a main part of the construction, a power window driving portion 7 which comprises the motor 9 driven to rotate by virtue of electric power, a speed reducing mechanism 10 for reducing the rotational output from the motor 9 to drive the wire 5 and a potentiosensor 20 for detecting the rotational angular position of an output shaft of the speed reducing mechanism 10. A worm 11 is fixed to one end portion of a rotating shaft 9a of the motor 9, and a worm wheel 12 is brought into mesh engagement with this worm 11, whereby the speed reducing mechanism 10 is constituted. In addition, a pulley 14 is fixed to one end portion of an output shaft 13 adapted to rotate together with the worm wheel 12 for the wire 5 to be wound thereround. This pulley 14 is installed in a casing 15 which is integrated with the motor 9. Therefore, when the motor 9 is driven and the pulley 14 is rotated in either direction via the speed reducing mechanism 10, the wire 5 is then driven and the windowpane 1 is moved in an opening or closing direction. In this mode of carrying out the invention, the windowpane completes the whole opening or closing stroke when the pulley 14 is rotated three to four times.

Figure 4A:
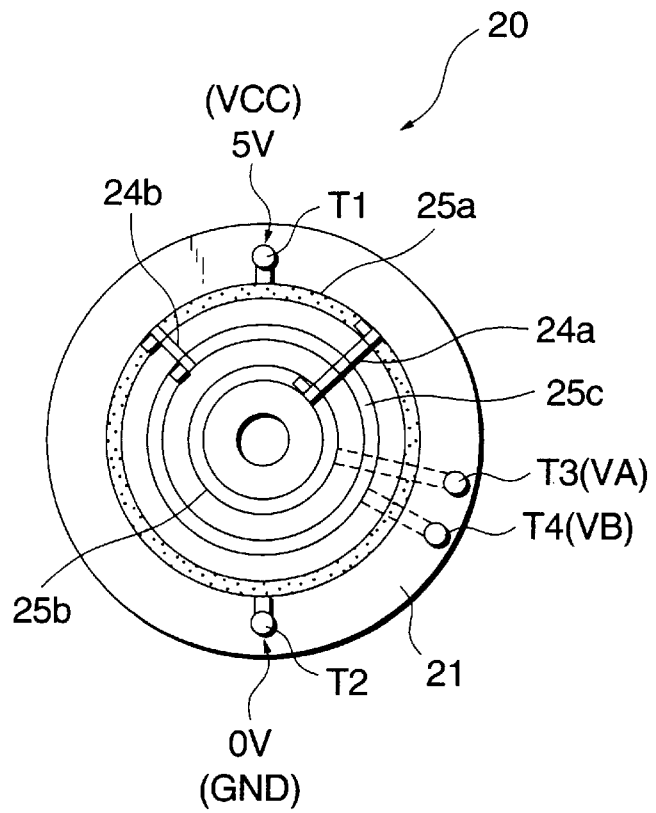
FIG. 4(a) is a plan view of a resistance track and FIG. 4(b) is a side view, partially cut-away, of the power window driving portion.
Figure 4B:
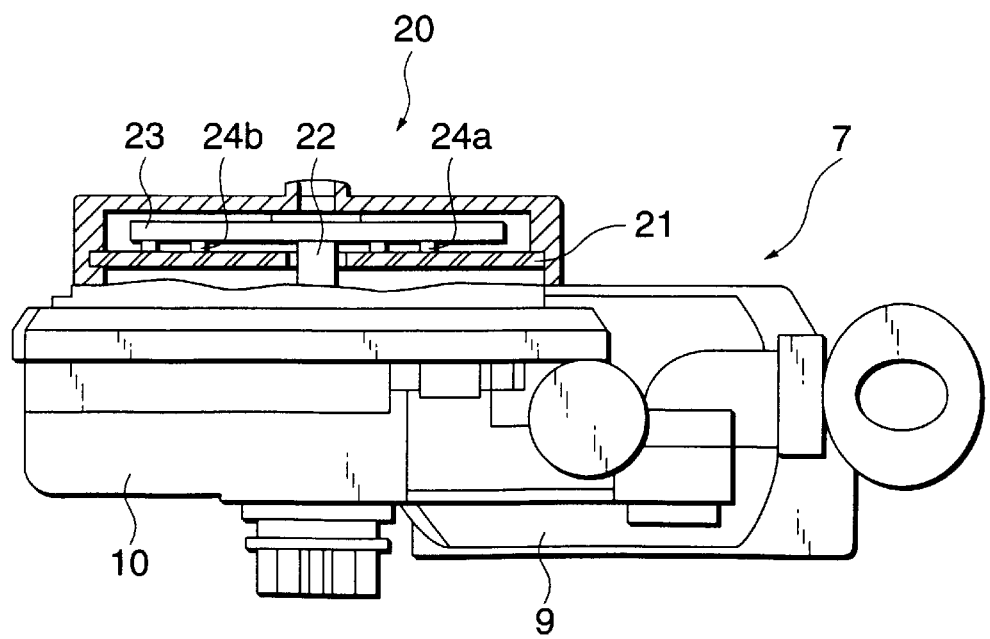

In addition, as shown in FIG. 4, the potentiosensor 20 is disposed at a position opposite to the pulley 14 which is disposed inside the casing 15. Integrally provided on the potentiosensor 20 are a circular resistance track plate 21 disposed at a position coaxial with the output shaft 13 of the worm wheel 12 and fixedly supported thereat, a potentioshaft 22 penetrating through a center hole of the resistance track plate 21 and integrally connected with the output shaft 13 in the rotating direction thereof, and a rotating plate 23 integrally supported on the potentioshaft 22 and having a pair of conductive brushes 24a, 24b adapted to move in the rotating direction on the resistance track plate 21. Three circular potentiotracks 25a to 25c are formed on a side of the resistance track plate 21 opposite to the side thereof where the rotating plate 23 is provided.

FIG. 4(a) is a pattern drawing showing the potentiotracks 25a to 25c formed on the resistance track plate 21, and those three circular potentiotracks 25a to 25c are disposed with the potentioshaft 22 on the surface of the variable resistance track plate made of an insulating material. Of these three tracks, the inner track 25a is formed of a material such as carbon as a resistance track, and the other two outer tracks 25, 25c are formed of a good conductive material such as copper as conductor tracks. Terminal portions T1, T2 are provided on two positions on the circumference of the resistance track 25a which are opposed at right angles to each other, and power sources VCC (5V) and GND (0V) are connected to the resistance track 25a via these terminal portions T1, T2. In addition, output voltages VA, VB, which will be described later, are constructed so as to be taken out from terminal portions T3, T4 of the conductor tracks 25b, 25c, respectively. The rotating plate 23 is formed into a circular plate which centers at the potentioshaft 22, and the conductive brushes 24a, 24b are fixedly supported at the circumferential positions which form an angle of 90 degrees relative to the center of the circular plate. The conductive brush 24a is constructed so as to short-circuit the resistance track 25a and the conductor track 25b provided on the resistance track plate 21, and the conductive brush 24b to establish an electrical continuity between the resistance track 25a and the conductor track 25c.

Figure 5A:
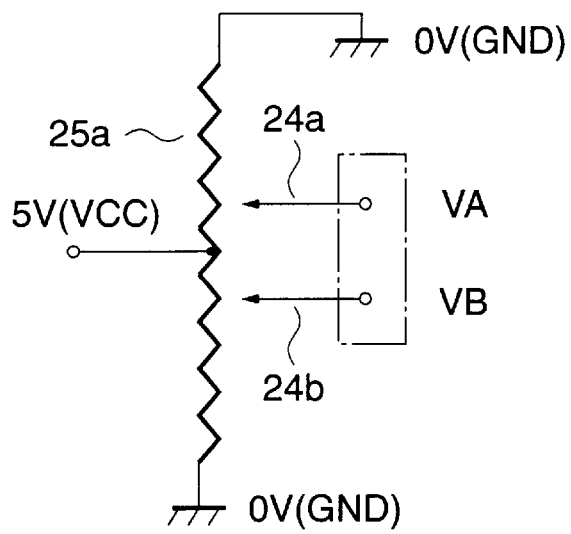
FIG. 5 is a diagram showing an equivalent circuit of the potentiosensor and the output property thereof.
Figure 5B:
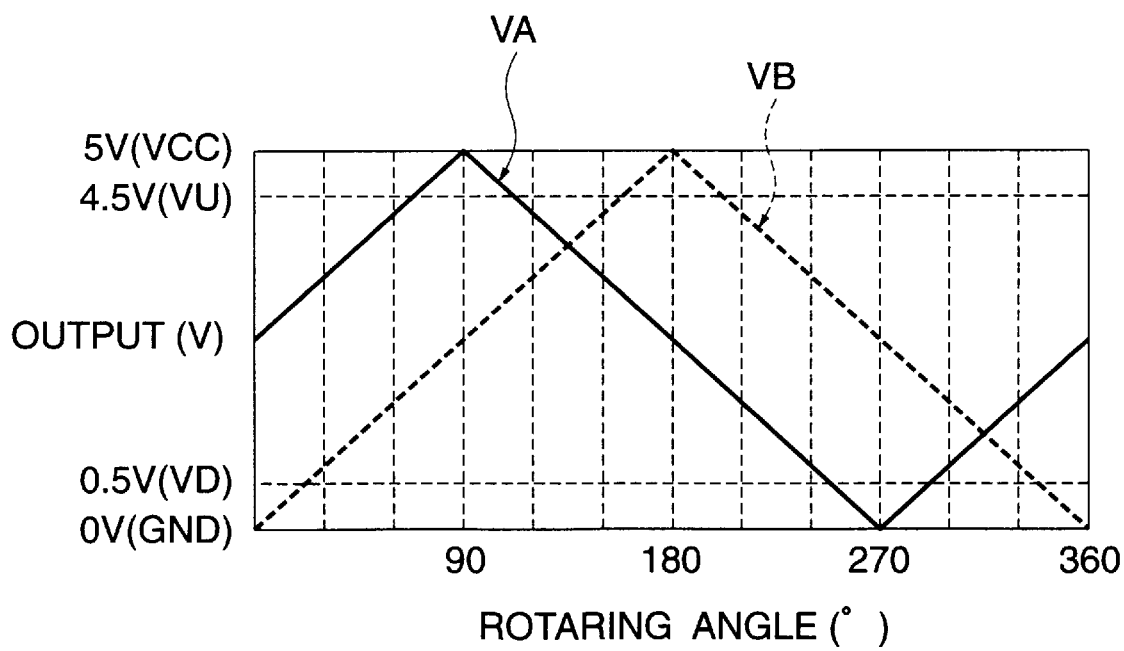

Therefore, when the driving motor 9 is driven, the rotational driving force of the driving motor 9 is transferred from the worm 11 of the rotating shaft 9a to the worm wheel 12, thereby rotating the output shaft 13 so that the pulley 14 drives the wire 5 so as to operate the windowpane 1 to open or close it. At the same time this happens, the rotating plate 23 is rotated, and an amount the rotating plate 23 is rotated is detected by the potentiosensor 20. Namely, when the rotating plate 23 is rotated, the conductive brushes 24a, 24b are rotated along surface of the resistance track plate 21. Due to this, the contact positions with the resistance track 25a of the two conductive brushes 24a, 24, which are in contact with the resistance track 25a at one of the ends thereof are shifted in the rotating direction, respectively, and in conjunction with this, output voltages VA, VB resulting from the division of the supply voltage VCC are outputted to the terminal portions T3, T4 of the conductor tracks 25b, 25c, and these outputs are changed as the conductive brushes 24a, 24b are rotated. When this happens, since the two conductive brushes 24a, 24b are disposed at the positions which are opposed at right angles to each other, the phases of the outputs are deviated 90 degrees relative to the rotating angle of the rotating plate. FIG. 5(a) is an equivalent circuit diagram of the potentiosensor 20, and FIG. 5(b) is a diagram showing the output property of the potentiosensor 20. The axis of abscissa of the graph in FIG. 5(b) represents the rotating angle of the rotating plate and the axis of ordinates represents electric values of the output voltages VA, VB outputted from the potentiosensor 20. As is seen from the diagram, the output voltage VA of the conductive brush 24a indicated by a solid line and the output voltage VB of the remaining conductive brush 24b indicated by a broken line deviate 90 degrees from each other.

Figure 6:
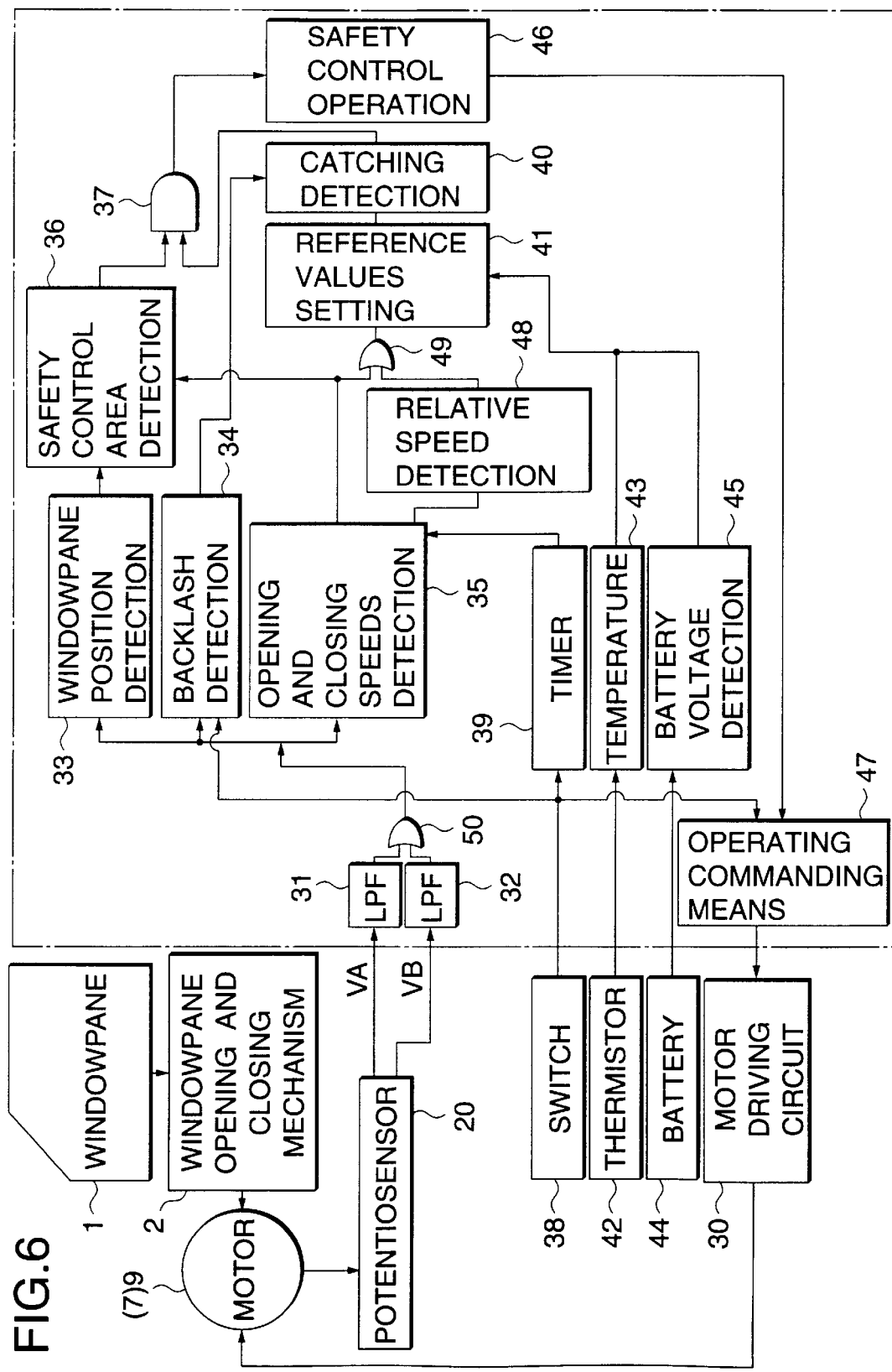
FIG. 6 is a block diagram showing the overall construction of a safety device according to the present invention.

FIG. 6 is a block diagram showing the overall construction of the safety device adopting the position sensor or the potentiosensor 20 of the present invention. The power window driving portion 7 is driven so as to rotate clockwise and counterclockwise by a motor driving circuit 30. Then, the windowpane is operated so as to open and close in conjunction with the clockwise and counterclockwise rotations of the driving motor 9, and the rotational angular position of the driving motor 9 is outputted from the potentiosensor 20 as the two output voltages VA, VB. These output voltages VA, VB are passed through a low-pass filter or LPF 31, 32 so as to remove noise thereon and thereafter are inputted via an OR gate 50 into a windowpane position detecting portion 33, a backlash detecting portion 34 and an opening and closing speeds detecting portion 35, respectively.

The position of the windowpane which is being operated to open or close is detected at the windowpane position detecting portion 33, and a detected opening or closing position of the windowpane is outputted to a safety control area detecting portion 36. The safety control area of the window is detected in this safety control area detecting portion 36 from the inputted opening or closing position. This safety control area is an area ranging from the state in which the windowpane is fully opened to a state in which the windowpane is nearly fully closed, and the safety control is to be carried out only within this area. Namely, in the state in which the windowpane is nearly fully closed the windowpane 1 is brought into contact with the sash 8 so as to produce a contact resistance, and then the contact resistance so produced creates a state resembling a state in which a foreign object is caught between the windowpane and the sash, and a catching detecting portion, which will be described later, detects the contact resistance as catching of a foreign object between the closing windowpane and the sash. Thus, the safety control area is provided to avoid a risk of the windowpane being not fully closed when the windowpane is nearly fully closed. An output from the safety control area detecting portion 36 is inputted into one of input ends of an AND gate 37.

On the other hand, the backlash detecting portion 34 turns on a window opening/closing switch 38 of the power window and detects a backlash in a closing operation after the opening operation of the windowpane through change in output voltage from the potentiosensor 20 in conjunction with a backlash generated when the windowpane is reversely operated between the clockwise and counterclockwise directions. In addition, the opening and closing speeds detecting portion 35 detects speeds of the windowpane when it is operated to open and close. In order to detect these speeds, a certain time period is counted by a timer 39 since the window opening/closing switch 38 is turned on at the opening and closing speeds detecting portion 35, and an operation is carried out using the change in voltage from the potentiosensor 20 during the certain time period for detection of an absolute speed when the windowpane is operated to open or close. Then, a relative speed is detected at a relative speed detecting portion 48 which is a changed speed of the windowpane so operated, and the absolute and relative speeds are then outputted to a reference value setting means 41. Then, catching of a foreign object by the windowpane is detected at a catching detecting portion 40 using detection outputs from the backlash detecting portion 34 and the opening and closing speeds detecting portion 35. In detection of the catching of a foreign object, the absolute or relative speed of the windowpane when it is operated to close is compared with the reference absolute or relative speed of the reference value setting portion 41 when there occurs no backlash, and when the closing speed is determined to be slower than the respective reference speeds, it is then determined that a foreign object is being caught in the window. Then, an output indicating that the foreign object is being caught is then inputted into the other input terminal of the AND gate 37. The respective reference speeds are set in advance, but referring to outputs from a temperature detecting portion 43 using a thermistor 42 and a battery voltage detecting portion 45 for detecting the voltage of a battery 44, the respective reference speeds are corrected so that they should not be varied by changes in temperature and battery voltage.

The AND gate 37 outputs a safety control operation signal when the windowpane stays within the safety control area and when catching of a foreign object is detected. On receipt of this safety control operation signal, a safety control operating portion 46 outputs an operation command to an operation commanding portion 47, and this operation commanding portion 47 controls the motor driving circuit 30 so as to reverse the driving motor 9 a predetermined amount, in other words, to rotate the driving motor 9 the predetermined amount in the opening direction. In a case where the hand or fingers of the passenger are caught between the windowpane 1 and the sash 8, this reverse operation of the windowpane opens the window without any delay, releasing the catching of the hand or fingers, whereby the safety control of the power window is effected.

Figure 7:
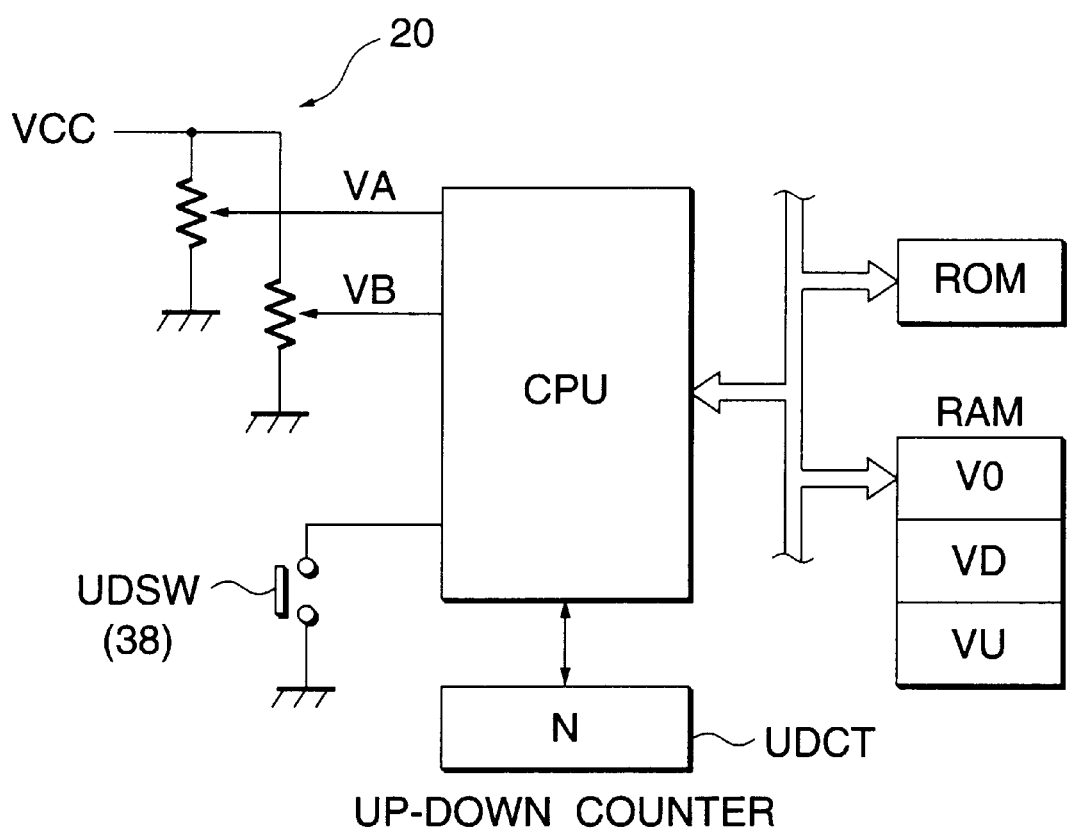
FIG. 7 is a block diagram showing the construction of a windowpane position detecting portion.

FIG. 7 is a block diagram showing the construction of the windowpane position detecting portion 33, which comprises a CPU to which the output voltages VA, VB from the potentiosensor 20 and a state signal of an up-down switch UDSW (38) for switching the direction of the windowpane to the closing (upward) direction or the opening (downward) direction are inputted, a ROM in which the operation program of this CPU is stored, a RAM for storing various set voltages which can be obtained from the respective voltages VA, VB and an up-down counter UDCT for use in selecting the output voltages VA, VB.

Figure 8:
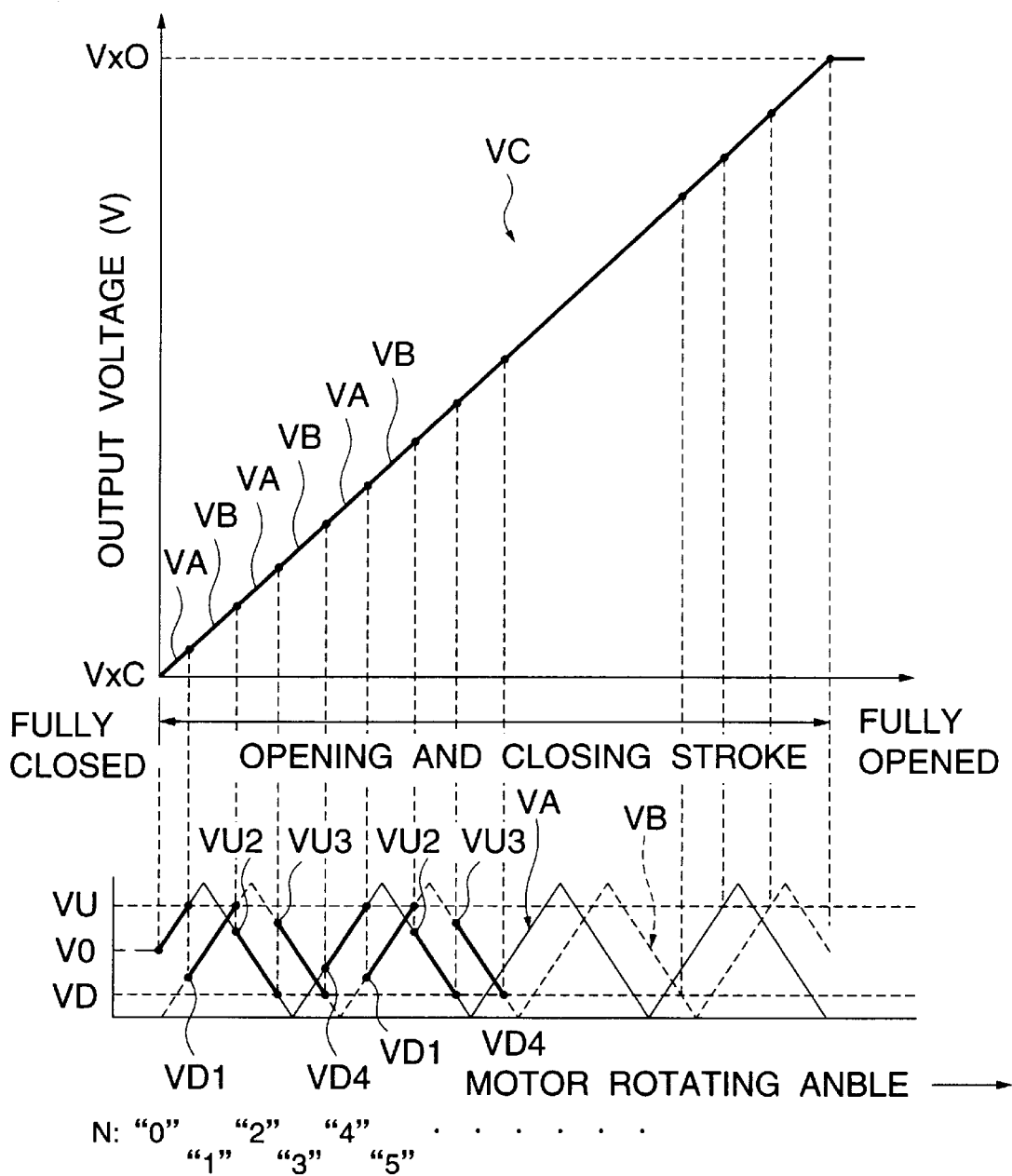
FIG. 8 is a diagram showing the relationship between voltages and opening and closing positions for explaining a detection method used at the windowpane position detecting portion.

FIG. 8 shows the output property of the potentiosensor 20 which follows the windowpane which is operated to open and close by virtue of the driving of the power window driving portion 7. The axis of abscissa represents the travelling distance of the windowpane, and it changes from the fully closed state to the fully opened state as it moves rightward in the figure. On the other hand, the axis of ordinates represents the output voltage of the potentiosensor 20, with VA denoting the output voltage from the conductive brush 24a of the rotating plate 23 of the potentiosensor 20, and VB denoting the output voltage from the other conductive brush 24b thereof. Then, at the windowpane position detecting portion, a virtual position voltage of the property indicated as VC in the figure is calculated from these outputs A, B, and the position of the opening or closing windowpane is detected from the position voltage VC so calculated. Here, assume that the maximum voltage VC of the output voltages VA, VB from the potentiosensor 20 is 5V, in consideration of a safety margin, the detectable maximum voltage VU is set at 4.5V, which is lower by 0.5V than the maximum voltage VC, and the detectable minimum voltage VD is set at 0.5V, which is higher by 0.5V than the minimum voltage of 0V. V0 denotes the voltage of VA when the windowpane is at the fully closed position, VD1 is the voltage of VB when VA is VU, VU2 is the voltage of VA when VB is VU, VU3 is the voltage of VB when VA is VD, and VD4 is the voltage of VA when VB is VD. In the figure, "0," "1," "2," "3," "4," . . . correspond to count values of the up-down counter UDCT, which will be described later.

Figure 9:
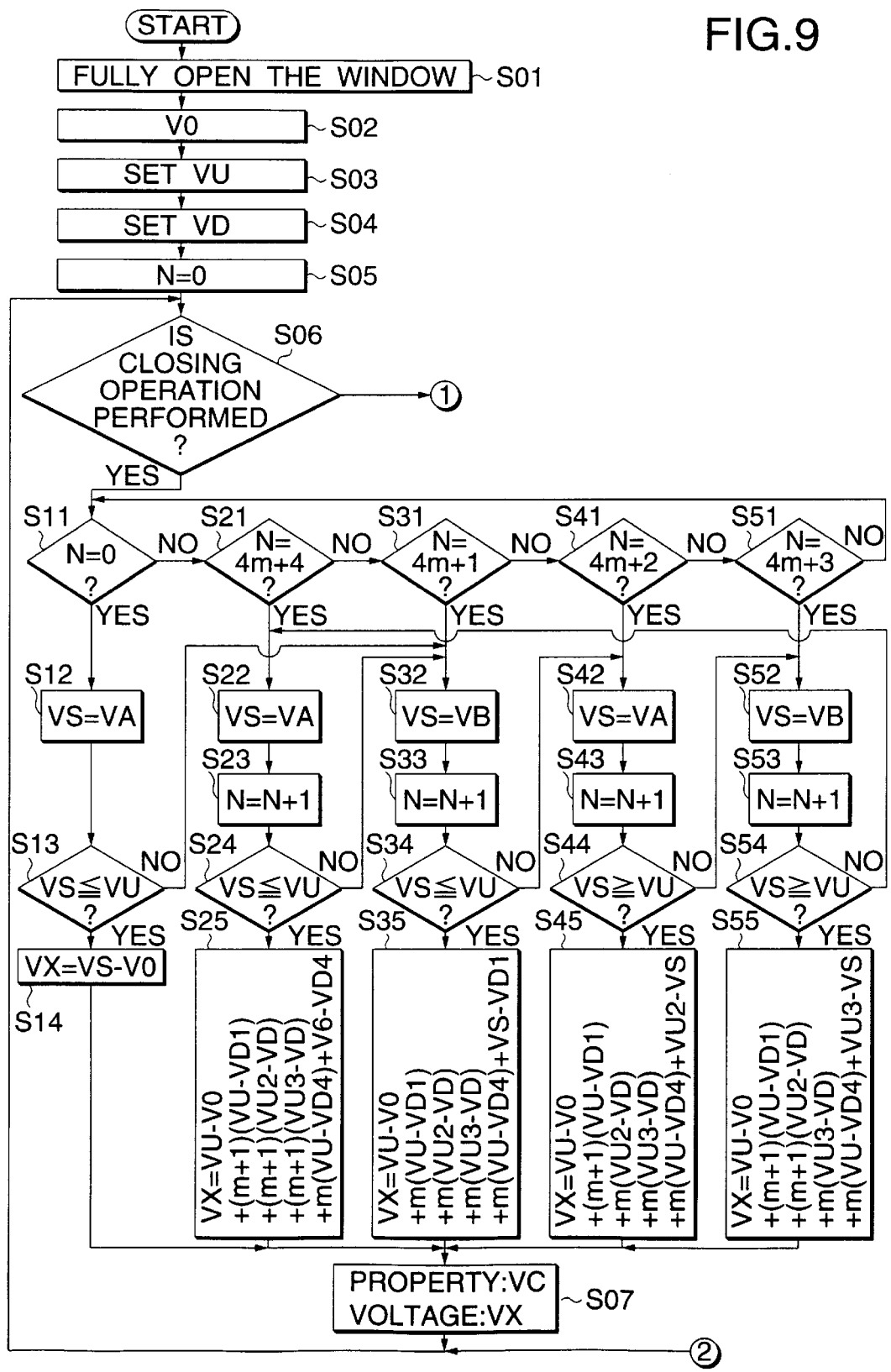
FIG. 9 is a flowchart No. 1 for explaining windowpane position detecting operations.

FIG. 9 is a flowchart showing position detecting operations carried out at the windowpane position detecting portion 33. First, an initialization is carried out at an assembly plant where a power window apparatus according to the present invention is assembled to an automotive vehicle. In this initialization, the windowpane 1 is moved upward until it reaches the fully closed state (S01), and one of output voltages outputted from the potentiosensor 20 when the windowpane is locked is detected. In this mode for carrying out the invention, the output voltage VA from the potentiosensor 20 is detected, and the voltage so detected is stored as a fully-closed state voltage V0 in the RAM (S02). In addition, the maximum voltage VCC of the output voltages VA, VB from the potentiosensor 20 is detected, and in this mode for carrying out the invention, the maximum voltage of 5V is detected, and 4.5V, which is lower by 0.5V than the maximum voltage, is stored as the detectable maximum voltage VU in the RAM (S03). The voltage of the output voltage VB or VA when the voltage of the output voltage VA or VB is the detectable maximum voltage VU is stored as the detectable minimum voltage VD in the RAM (S04). Thereafter, a count value N is set to N=0 by the updown counter UDCT (S05). This initialization can also be carried out as required after vehicles are assembled through a resetting operation. Thus, in order to detect the position of the windowpane of the power window apparatus initialized as described above, first, the output voltages VA, VB from the potentiosensor 20 are detected, and whether the windowpane is operated to open or close is detected from an opening or closing information signal from the window opening/closing switch UDSW (S06). When the windowpane is operated to open, the value N of the up-down counter is judged (S11), and if N=0, the output value VA is set to VS (S12). Then, this voltage VS is compared with the detectable maximum voltage VU (S13). If the voltage VS is equal to or lower than VU, then $$Vx = VS - V0 \tag{1}$$

is obtained from the voltage VS and the fully-closed state voltage V0 (S14), and the windowpane position is detected by making this Vx correspond to the area of "0" of the output property VC in FIG. 8 (S07). In other words, the windowpane position of the axis of abscissa is detected from the Voltage Vx of the axis of ordinates.

In addition, in Step S13, when VS is higher than VU, the voltage VB is adopted as VS (S32). Let the value N of the up-down counter UDCT be N=N+1 (S33), the voltage VS is compared with the detectable maximum voltage VU (S34), and if VS is equal to or lower than VU, then $$Vx = VU - V0 + m(VU - VD1) + m(VU2 - VD) + m(VU3 - VD) + m(VU - VD4) + VS - VD1 \tag{2}$$

is obtained from the voltage VS, fully-closed state voltage V0, detectable minimum voltage VD, and respective voltages VD1, VU2, VU3 and VD4 (S35), and the window position is detected by making this Vx correspond to the area of "1" of the output property VC in FIG. 8 (S07). Here, m is a positive integer including 0.

In Step 34, if VS is higher than VU, the voltage VA is adopted as VS (S42), and let the value N of the up-down counter be N=N+1 (S43). Then the voltage VS is compared with the detectable minimum voltage VD (S44), and if VS is equal to or larger than VD, then control proceeds to Step S45 to obtain Vx. Here, $$Vx = VU - V0 + (m+1)(VU - VD1) + m(VU2 - VD) + M(VU3 - VD) + m(VU - VD4) + VU2 - VS \tag{3}$$

The window position is detected by making this Vx correspond to the area of "2" of the output property VC in FIG. 8 (S07).

In Step S44, if VS is lower than VD, the voltage VB is adopted as VS (S52), and let the value N of the up-down counter be N=N+1 (S53). Then, the voltage VS is compared with the detectable minimum voltage VD (S54), and if VS is equal to or larger than VD, then control proceeds to Step S55 to obtain Vx.
Here, $$Vx = VU - V0 + (m+1)(VU - VD1) + (m+1)(VU2 - VD) + m(VU3 - VD) + m(VU - VD4) + VU3 - VS \tag{4}$$

The window position is detected by making this Vx correspond to the area of "3" of the output property VC in FIG. 8 (S07).

In step S54, when VS is lower than VD, then, the voltage VA is adopted as VS (S22), and let the value N of the up-down counter be N=N+1 (S23). Then, the voltage VS is compared with the detectable maximum voltage VU (S24), and if VS is equal to or smaller than VU, control proceeds to Step S25 to obtain Vx.
Here, $$Vx=VU-V0+(m+1)(VU-VD1)+(m+1)(VU2-VD)+(m+1)(VU3-VD)+m(VU-VD4)+VS-VD4 \quad (4)$$

The window position is detected by making this Vx correspond to the area of "4" of the output property VC in FIG. 8 (S07).

In addition, in Step S24, when VS is higher than VU, control returns to Step S32 and the following steps are performed as described above.

In Step S11, if the value N of the up-down counter is other than "0," in other words, when the flow starts from an intermediate state between the state in which the windowpane is fully closed and the state in which the windowpane is fully opened, whether or not the value N is any of 4m+1, 4m+2, 4m+3 and 4m+4 (m is a positive integer including 0) is judged in Steps S21, S31, S41 and S51. If N is 4m+1, control proceeds to Step S32, and the voltage VB is adopted as VS. If N is 4m+2, control proceeds to Step S42, and the voltage VA is adopted as VS. If N is 4m+3, control proceeds to Step S52, and the voltage VB is adopted as VS. If N is 4m+4, control proceeds to S22, and the voltage VA is adopted as VS. Then, steps following the respective steps are similar to those which have already been described above.

Figure 10:
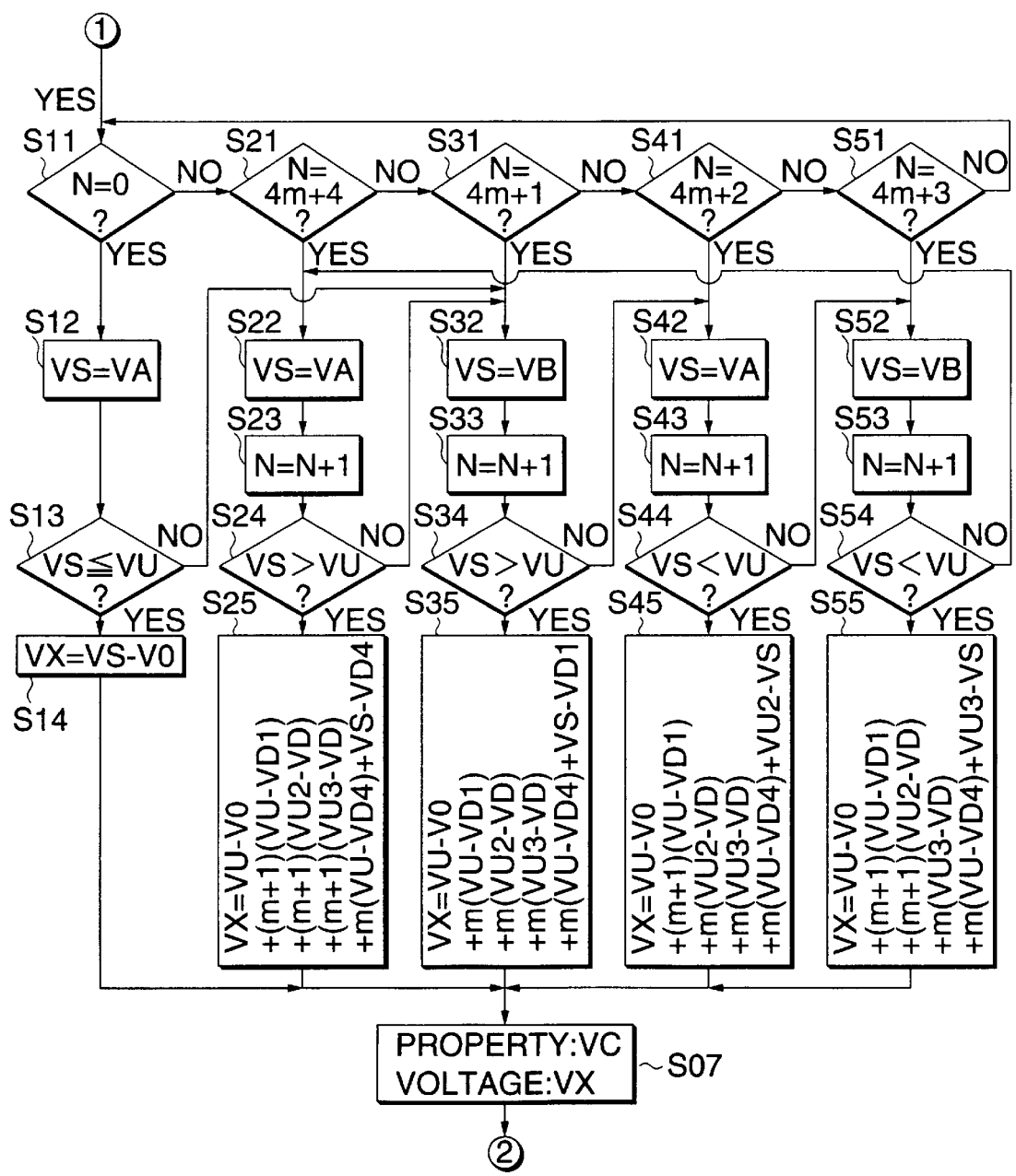
FIG. 10 is a flowchart No. 2 for explaining further windowpane position detecting operations.

In Step S06, a process to be carried out when the power window apparatus performs the closing operation is basically the same as the process carried out for the opening operation, and the judgement "VS□VU?" made in Steps S24, S34, S44 and S54 may be replaced with "VS>VD?," and with respect to the value N of the counter, the "N=N+1" in Steps S23, S33, S34, S44 may be replaced with "N=N−1." A flowchart therefor is shown in FIG. 10, and like reference numerals are given to portions corresponding to portions of the respective flows in FIG. 9, and descriptions thereof will omitted.

As is clear from the results of the above descriptions of the flowcharts, Vx which is the voltage corresponding to VC is obtained by utilizing sequentially the areas of the properties of VA, VB which are indicated by thick solid lines, and the windowpane position can be detected based on this Vx. In this property, since it is characteristic of the potentiosensor 20 that the output is changed between 0V to 5V when the rotating angles of the conductive brushes 24a, 24b of the rotating plate 23 are 180 degrees, the ratio of voltage change to windowpane position change can be made larger than that realized with the previously proposed technology, whereby the detecting resolution in detecting the window position can be improved. In addition, since the resistance track 25a is circular and since the conductive brushes 24a, 24b can output power over the whole rotational angular area, output power is available over the entire rotational angular position of the driving motor, whereby the output property can be stabilized. This enables detection of the windowpane position with high accuracy and hence realizes more reliable safety control.

As has been described heretofore, since the present invention comprises the position sensor for detecting the rotational angular position of the driving motor for opening and closing the windowpane as a sensor for detecting the position of the windowpane which is being operated to open or close, with a view to performing safety control of the catching of a foreign object in the windowpane, the whole stroke of the windowpane from the fully closed position to the fully opened position can be detected with only signals from the driving motor, and therefore, there is no need to dispose the position sensor along the full length of the guide rail as is done with the conventional example. Thus, when compared with the conventional construction, the present invention can miniaturize the construction and simplify the circuit, whereby equipment can be realized which is suitable for application to automotive vehicles. In addition, since the present invention has the circular resistance track as the position sensor and since the resistance value between the terminal portions provided at the two diametrically opposed positions of the circular resistance track is constructed to be divided for output, the ratio of change in output to change in windowpane position can be increased to enable the detection of the windowpane position with high accuracy, and moreover, output power is available over the entire rotating position of the driving motor, whereby the output property is stabilized, enabling the detection of the windowpane position with high reliability and hence the provision of the power window apparatus which can realize more appropriate safety control.

What is claimed is:

1. A safety device for power windows in which a driving motor is operated to open and close a windowpane of a vehicle, and in which the position of the windowpane is detected so as to safely control catching of a foreign object between the windowpane and a window frame, comprising:

a position sensor for detecting a rotational angular position of the driving motor;

means for detecting the position of the windowpane based on an output from said position sensor; and means for safely controlling catching of a foreign object in the window-pane and the window frame based on an output of said position detecting means, wherein said position sensor is a potentiosensor, said potentiosensor comprising:

a resistance track comprising a circular electric resistor pattern; and conductive brushes rotating relative to said resistance track as the driving motor is driven and contacting said resistance track, wherein said resistance track includes electrodes at two diametrically opposed points on the circumference of said resistance track, and further wherein movement of each one of said conductive brushes results in a division of resistance between said electrodes.

2. A safety device for power windows as set forth in claim 1, wherein a higher electric potential is supplied to one of said electrodes of said resistance track, while a lower electric potential is supplied to the other electrode, and said division of resistance is between said higher electric potential and said lower electric potential.

3. A safety device for power windows as set forth in claim 2, wherein said conductive brushes comprise a first conductive brush and a second conductive brush that are separated by 90 degrees in a rotational direction along said circular electric resistor pattern, and further wherein said potentiosensor outputs a first signal corresponding to the movement of said first conductive brush and the driving motor and a second signal, which is out of phase with said first signal, corresponding to the movement of said second conductive brush and the driving motor.

* * * * *